US012221819B2

(12) United States Patent
Rrumbullaku et al.

(10) Patent No.: US 12,221,819 B2
(45) Date of Patent: Feb. 11, 2025

(54) TIP-TO-CLOSE ON SERVO-POWER ASSISTED DOORS

(71) Applicant: GM GLOBAL TECHNOLOGY OPERATIONS LLC, Detroit, MI (US)

(72) Inventors: Besi Rrumbullaku, Rochester, MI (US); Phillip C. Storck, III, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 153 days.

(21) Appl. No.: 18/159,993

(22) Filed: Jan. 26, 2023

(65) Prior Publication Data

US 2024/0254822 A1 Aug. 1, 2024

(51) Int. Cl.
*E05F 15/611* (2015.01)

(52) U.S. Cl.
CPC ......... *E05F 15/611* (2015.01); *E05Y 2201/43* (2013.01); *E05Y 2400/36* (2013.01); *E05Y 2400/40* (2013.01); *E05Y 2400/44* (2013.01); *E05Y 2900/531* (2013.01)

(58) Field of Classification Search
CPC ............... E05F 15/611; E05Y 2201/43; E05Y 2400/36; E05Y 2400/40; E05Y 2400/44; E05Y 2900/531
USPC .......................................................... 318/461
See application file for complete search history.

(56) References Cited

U.S. PATENT DOCUMENTS

| | | | | |
|---|---|---|---|---|
| 2016/0285394 | A1* | 9/2016 | Kubota | H02P 29/02 |
| 2018/0202212 | A1* | 7/2018 | Xiao | E05F 3/00 |
| 2022/0243521 | A1* | 8/2022 | Herman | E05F 15/622 |
| 2023/0287726 | A1* | 9/2023 | Kaneda | E05F 15/75 |

* cited by examiner

*Primary Examiner* — Kawing Chan
(74) *Attorney, Agent, or Firm* — CANTOR COLBURN LLP

(57) ABSTRACT

Aspects of the disclosure include a door control system with tip-to-close functionality for use in doors having a power assist function. An exemplary door control system can include an actuator configured to open and close a power-assist door and a sensor configured to measure a velocity of the power-assist door. The door control system can further include a servo-assist module (SAM) communicatively coupled to the actuator and the sensor. The SAM can be configured to initiate a tip-to-close function of the power-assist door responsive to door velocity measurements from the sensor and a natural deceleration rate of the power-assist door caused by actuator dampening.

20 Claims, 6 Drawing Sheets

TIP-TO-CLOSE ON SERVO-POWER ASSISTED DOORS

INTRODUCTION

The subject disclosure relates to automotive doors, hatches, and tailgates, and particularly to an electronic door control system with tip-to-close functionality for use in doors having a power assist function.

Consumer convenience, accessibility, and comfort are key components in a successful automotive model and manufacturers continually work to design new or refreshed vehicle models having features which improve one or more of those components. For example, the power-assist function (also referred to as motor assist, servo-power assist, door haptics, powered door or tailgate, etc.) is a feature that can address all three of these considerations. A power assist door, for example, includes a motor (e.g., servo-motor) and actuator (e.g., hydraulics, rack and pinion, etc.) for automatically opening and/or closing the door.

Power assist functions can improve the consumer experience by allowing users to operate (e.g., open and close) a door using only a small manual force, as the power assist motor can replace much of the manual effort. In some configurations, operation of the power assist door (or tailgate, hatch, etc.) can be controlled via a switch provided in a driver or passenger seat, a rear part of the vehicle, and/or a remote control of the vehicle.

SUMMARY

In one exemplary embodiment a door control system with tip-to-close functionality for use in doors having a power assist function can include an actuator configured to open and close a power-assist door and a sensor configured to measure a velocity of the power-assist door. The door control system can further include a servo-assist module (SAM) communicatively coupled to the actuator and the sensor. The SAM can be configured to initiate a tip-to-close function of the power-assist door responsive to door velocity measurements from the sensor and a natural deceleration rate of the power-assist door caused by actuator dampening.

In some embodiments, initiating the tip-to-close function of the power-assist door includes determining that a first velocity of the power-assist door measured at a first time has reached a first target velocity, determining that a second velocity of the power-assist door measured at a second time after the first time has reached a second target velocity, and comparing a door deceleration rate between the first time and the second time to a deceleration threshold. In some embodiments, the deceleration threshold is equal to the natural deceleration rate of the power-assist door caused by actuator dampening.

In some embodiments, initiating the tip-to-close function of the power-assist door further includes, responsive to the door deceleration rate being equal to or less than the deceleration threshold, instructing the actuator to fully close the power-assist door. In some embodiments, initiating the tip-to-close function of the power-assist door further includes, responsive to the door deceleration rate being greater than the deceleration threshold, maintaining the power-assist door in a manually operated state.

In addition to one or more of the features described herein, in some embodiments, the first target velocity is equal to 28 degrees per second and the second target velocity is equal to 17 degrees per second.

In some embodiments, initiating the tip-to-close function of the power-assist door includes determining that a first velocity of the power-assist door measured at a first time has reached a first target velocity, waiting for a predetermined delay duration, and comparing, after the predetermined delay duration, a second velocity of the power-assist door to a second target velocity.

In some embodiments, initiating the tip-to-close function of the power-assist door further includes, responsive to the second velocity being equal to the second target velocity, instructing the actuator to fully close the power-assist door. In some embodiments, initiating the tip-to-close function of the power-assist door further includes, responsive to the second velocity being less than the second target velocity, maintaining the power-assist door in a manually operated state.

In another exemplary embodiment a vehicle includes a power-assist door and a door control system with tip-to-close functionality. The door control system can include an actuator configured to open and close the power-assist door, a sensor configured to measure a velocity of the power-assist door, and a SAM communicatively coupled to the actuator and the sensor. The SAM can be configured to initiate a tip-to-close function of the power-assist door responsive to door velocity measurements from the sensor and a natural deceleration rate of the power-assist door caused by actuator dampening.

In yet another exemplary embodiment a method for providing tip-to-close functionality in doors having a power assist function can include providing an actuator configured to open and close a power-assist door, providing a sensor configured to measure a velocity of the power-assist door, and providing a SAM communicatively coupled to the actuator and the sensor. The SAM can be configured to initiate a tip-to-close function of the power-assist door responsive to door velocity measurements from the sensor and a natural deceleration rate of the power-assist door caused by actuator dampening.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
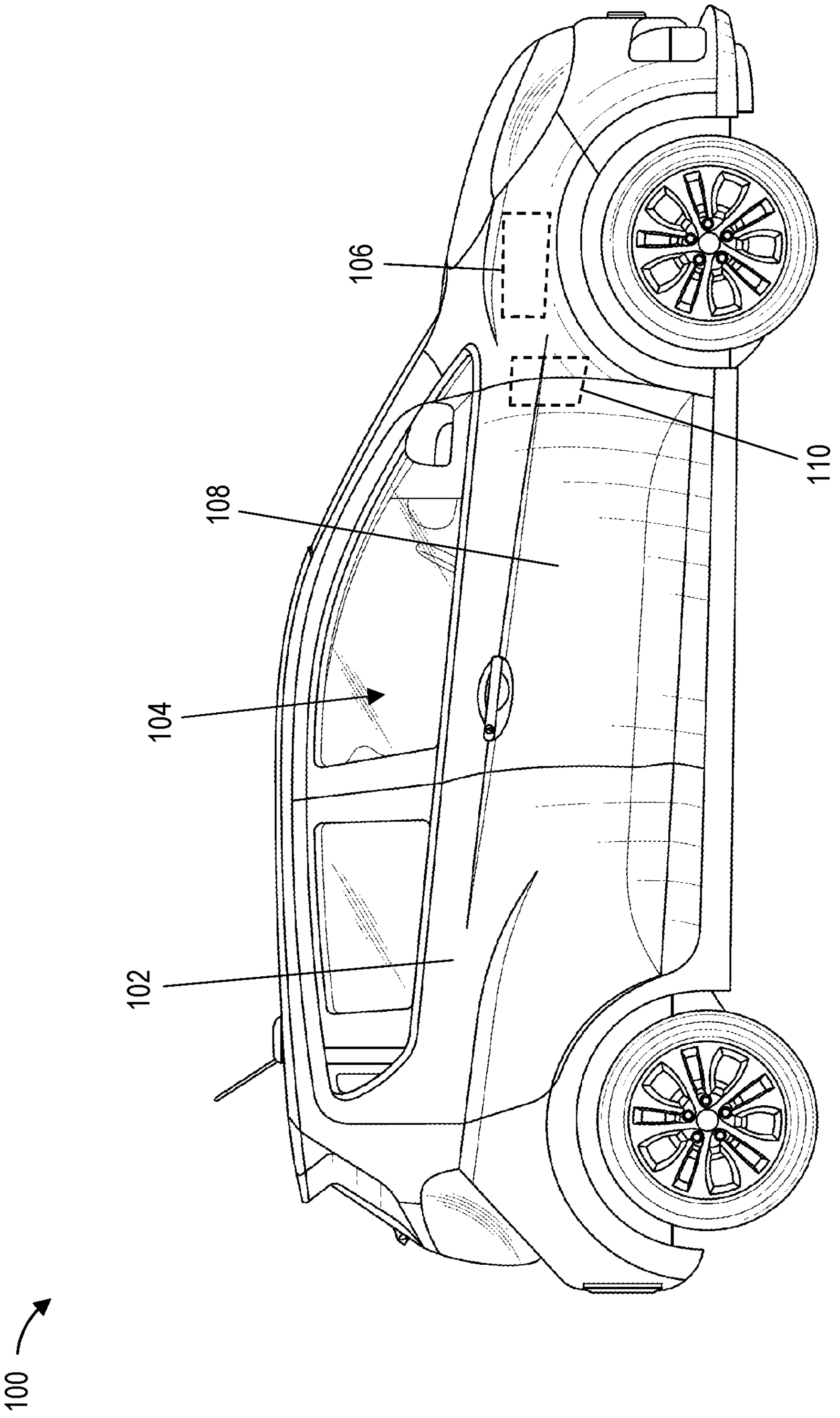
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

As will be detailed herein, the vehicle 100 further includes a door 108 and a door control system 110 configured to assist in operating the door 108. In some embodiments, the door control system 110 and/or the door 108 are equipped with power-assist capabilities. The door control system 110 is shown for ease of illustration and discussion only. It should be understood that the configuration, location, size, arrangement, etc., of the door control system 110 is not meant to be particularly limited, and all such configurations (including configurations where portions of the door control system 110 are distributed along and between the door 108 and/or the body 102 of the vehicle 100) are within the contemplated scope of this disclosure. Moreover, while the disclosure is discussed primarily in the context of a door control system 110 configured for the door 108 of the vehicle 100, aspects described herein can be similarly incorporated within any system (vehicle, building, or otherwise) having a movable barrier (door, hatch, gate, tailgate, etc.) that allows ingress and egress, and all such configurations are within the contemplated scope of this disclosure.

Power assist functions can improve the consumer experience by allowing users to operate (e.g., open and close) a door using only a small manual force, as the power assist motor can replace much of the manual effort. Tip-to-close is another type of function similarly designed to improve consumer convenience. With tip-to-close (also referred to as a self-closing or a soft-closing function), a door, drawer, latch, etc. is designed to complete a closing operation after an initial user input, typically using a mechanical system (e.g., a spring-action mechanism, spring and damper, etc.). In general, a door having a tip-to-close function will automatically and completely close after the door is brought to a specified degree of closure.

Unfortunately, current power-assist solutions (e.g., doors that have a manual assist, a hatch with a servo assist function, etc.) are not natively compatible with a tip-to-close function. In short, if a tip-to-close function is added to a power-assist door, the manual operation of the door in the closing direction becomes nearly unusable as the door is always trying to power close. This is due to the fact that existing door controllers are not configured to determine a user's intent when manipulating the door.

This disclosure introduces a new type of door control system that enables power closures with back-drivable motors that include a motor assist function (e.g., servo assist/haptic doors, etc.) while also providing a predictable, smooth tip-to-close function. In some embodiments, the door control system is configured to actively monitor the door speed over time and to compare this speed to the known, natural dampening rate (referred to as a deceleration rate) created by the back-drivable motor. The door control system is further configured to leverage this comparison to separate manual inputs (i.e., those made by a driver and/or passenger) into the door from the natural back drive deceleration rate.

By understanding the natural deceleration of the door due to motor back drive torque, the door control system can infer the intent of a user operating the door. For example, the door control system can distinguish between a user manually intending to move the door versus a user tipping the door with the expectation that a door controller of the door control system will take over. In some embodiments, the door control system employs custom, highly configurable logic to determine the customer's intended door function, providing for a smooth door operation that matches the customer's intended use.

Door control systems constructed in accordance with one or more embodiments offer several technical advantages over prior solutions. In particular, door control systems described herein can provide a tip-to-close function for any application, including power-assist doors with back-drivable motors that are not normally compatible with tip-to-close. Other advantages are possible.

Figure 2:
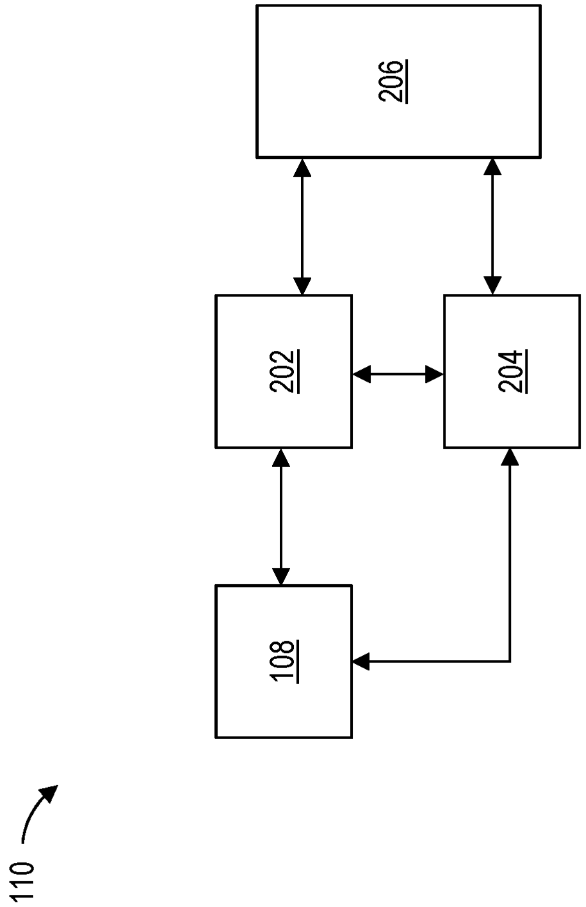
FIG. 2 is a block diagram of a door control system with tip-to-close functionality for use in doors having a power assist function in accordance with one or more embodiments.

FIG. 2 illustrates a block diagram of a door control system 110 in accordance with one or more embodiments. The door control system 110 can be included within the vehicle 100 of FIG. 1, although other applications are within the contemplated scope of this disclosure. In some embodiments, the door 108 is included with the door control system 110. In some embodiments, the door control system 110 is configured to open and/or close the door 108.

In some embodiments, the door control system 110 includes an actuator 202. In some embodiments, the actuator 202 is one of a power door actuator and a back-drivable motor, although other actuator configurations are within the contemplated scope of this disclosure.

In some embodiments, the door control system 110 includes a sensor 204. In some embodiments, the sensor 204 is a Hall sensor, although other sensor configurations are within the contemplated scope of this disclosure. In some embodiments, the sensor 204 is configured to measure or otherwise monitor a velocity of the door 108. In some embodiments, the sensor 204 includes a plurality of sensors. In some embodiments, the sensor 204 is incorporated within one or both of the actuator 202 and/or the door 108.

In some embodiments, the door control system 110 includes a servo-assist module (SAM) 206. In some embodiments, the SAM 206 includes software, hardware, firmware, and/or logic controls for activating power assist and tip-to-close functions for the door 108. The software and logic controls for the SAM 206 are discussed in greater detail with respect to FIGS. 3 and 4.

In some embodiments, the SAM 206 is configured to receive state data from the actuator 202, the sensor 204, and/or the door 108 and to transmit command data to the actuator 202, the sensor 204, and/or the door 108. The state data can include, for example, a position, velocity, acceleration, and/or deceleration of the door 108. The command data can include, for example, an instruction to the actuator 202 and/or the door 108 to initiate a power-assist close, a power-assist open, and/or a tip-to-close function. In some embodiments, one or more components of the door control system 110 (e.g., actuator 202, SAM 206, etc.) are communicatively coupled via one or more power and/or signal lines (wires) (not separately indicated), although other communication schemes, such as wireless, are within the contemplated scope of this disclosure. Similarly, one or more components of the door control system 110 (e.g., actuator 202, SAM 206, etc.) can be communicatively coupled and/or powered via one or more power and/or signal lines (wires) (not separately indicated) to any other component, such as, for example, a power source, an electronic control unit (ECU) of the vehicle 100, etc.

Figure 3:
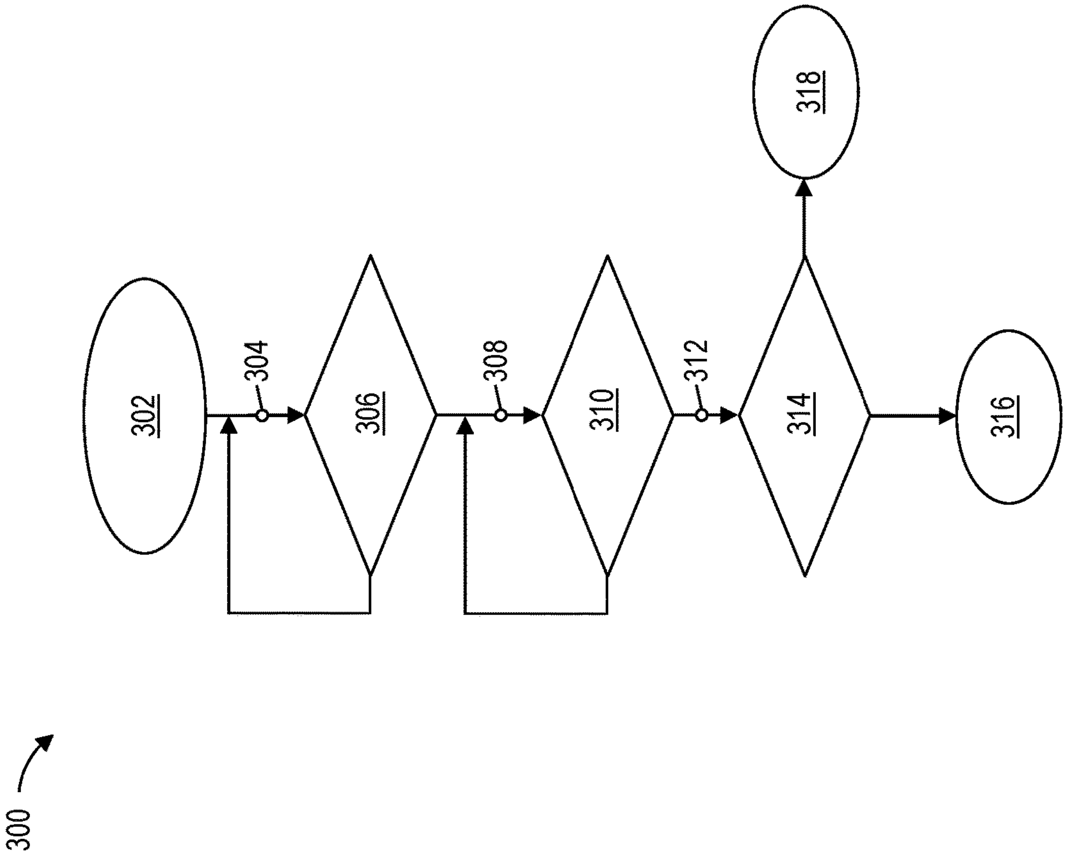
FIG. 3 is a flowchart for a control scheme for a door control system with tip-to-close functionality in accordance with one or more embodiments.

FIG. 3 is a flowchart for a control scheme 300 for a door control system 110 with tip-to-close functionality in accordance with one or more embodiments. At block 302, the control scheme 300 starts with the door in any open position.

At block 304, a first door velocity measurement is made. In some embodiments, the first door velocity is monitored using a sensor (e.g., the sensor 204 of the vehicle 100).

At block 306, the first door velocity is compared against a first threshold. In some embodiments, the first threshold is a first target velocity. The first target velocity can be arbitrarily defined depending on the needs of a particular application. In some embodiments, the first target velocity defines a minimum speed threshold for activating a tip-to-close function of the control scheme 300. In some embodiments, the first target velocity defines an initial speed for calculating a door deceleration. In some embodiments, the first target velocity is 28 degrees per second, although other target velocities are within the contemplated scope of this disclosure.

If the first door velocity has reached the first threshold (i.e., is greater than or equal to the first threshold), the control scheme 300 continues to block 308. If the first door velocity is less than the first threshold, the control scheme 300 returns to block 304. In other words, the control scheme 300 continually and/or periodically measures the first door velocity until the first threshold is reached.

At block 308, a second door velocity measurement is made. In some embodiments, the second door velocity is monitored using a sensor (e.g., the sensor 204 of the vehicle 100).

At block 310, the second door velocity is compared against a second threshold. In some embodiments, the second threshold is a second target velocity. The second target velocity can be arbitrarily defined depending on the needs of a particular application. In some embodiments, the second target velocity defines a final speed for calculating a door deceleration. In some embodiments, the second target velocity is 17 degrees per second, although other target velocities (sometimes referred as a slowing velocity target) are within the contemplated scope of this disclosure.

If the second door velocity has reached the second threshold (i.e., is at or below the second threshold), the control scheme 300 continues to block 312. If the second door velocity has not yet reached (i.e., is greater than) the second threshold, the control scheme 300 returns to block 308. In other words, the control scheme 300 continually and/or periodically measures the second door velocity until the second threshold is reached.

At block 312, a door deceleration rate is calculated. In some embodiments, the door deceleration rate is calculated over the time between achieving the first door velocity and achieving the second door velocity.

At block 314, the door deceleration rate is compared against a deceleration threshold. In some embodiments, the deceleration threshold is the natural rate of deceleration of the door 108 due to dampening caused by the actuator 202 of the door control system 110. In some embodiments, the door deceleration rate is a predetermined rate empirically measured for a particular application.

If the door deceleration rate is equal to or less than the deceleration threshold, the control scheme 300 continues to block 316. If the door deceleration rate is greater than the deceleration threshold, the control scheme 300 continues to block 318.

At block 316, the control scheme 300 completes a tip-to-close operation. In some embodiments, the tip-to-close operation includes closing the door until a fully closed condition is achieved. In some embodiments, the tip-to-close operation includes closing the door at a predetermined closing speed. In some embodiments, the predetermined closing speed is equal to the second door velocity, although other closing speeds are within the contemplated scope of this disclosure. For example, in some embodiments, the second target velocity is 17 degrees per second and the predetermined closing speed is 17 degrees per second.

At block 318, the control scheme 300 cancels a tip-to-close operation. In some embodiments, the control scheme 300 allows the door to continue to be operated in a manual mode (i.e., by a user of the vehicle 100). In this manner, the control scheme 300 avoids an unintended activation of the tip-to-close operation.

Figure 4:
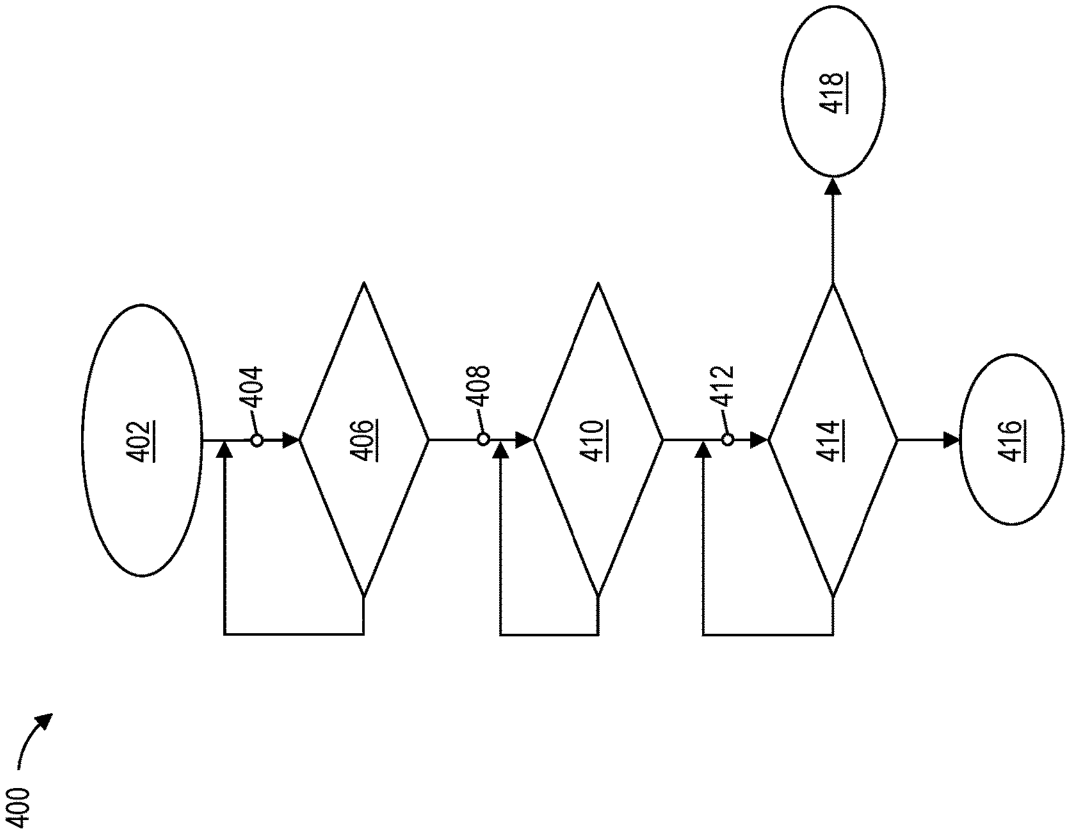
FIG. 4 is a flowchart for another control scheme for a door control system with tip-to-close functionality in accordance with one or more embodiments.

FIG. 4 is a flowchart for another control scheme 400 for a door control system 110 with tip-to-close functionality in accordance with one or more embodiments. At block 402, the control scheme 400 starts with the door in any open position.

At block 404, a first door velocity measurement is made. In some embodiments, the first door velocity is monitored using a sensor (e.g., the sensor 204 of the vehicle 100).

At block 406, the first door velocity is compared against a first threshold. In some embodiments, the first threshold is a first target velocity. The first target velocity can be arbitrarily defined depending on the needs of a particular application. In some embodiments, the first target velocity defines a minimum speed threshold for activating a tip-to-close function of the control scheme 400. In some embodiments, the first target velocity defines an initial speed for calculating a door deceleration. In some embodiments, the first target velocity is 28 degrees per second, although other target velocities are within the contemplated scope of this disclosure.

If the first door velocity has reached the first threshold (i.e., is greater than or equal to the first threshold), the control scheme 400 continues to block 408. If the first door velocity is less than the first threshold, the control scheme 400 returns to block 404. In other words, the control scheme 400 continually and/or periodically measures the first door velocity until the first threshold is reached.

At block 408, a delay timer is initialized.

At block 410, the delay timer is compared against a predetermined delay duration. The predetermined delay duration can be arbitrarily defined depending on the needs of a particular application. In some embodiments, the predetermined delay duration is 200 milliseconds, although other delay durations are within the contemplated scope of this disclosure.

If the delay timer has reached the predetermined delay duration (e.g., at or after 200 milliseconds), the control scheme 400 continues to block 412. If the delay timer has not yet reached the predetermined delay duration (e.g., less than 200 milliseconds), the control scheme 400 remains at block 410. In other words, the control scheme 400 waits at block 410 until the predetermined delay duration has elapsed.

At block 412, a second door velocity measurement is made. In some embodiments, the second door velocity is monitored using a sensor (e.g., the sensor 204 of the vehicle 100).

At block 414, the second door velocity is compared against a second threshold. In some embodiments, the second threshold is a second target velocity. The second target velocity can be arbitrarily defined depending on the needs of a particular application. In some embodiments, the second target velocity is 17 degrees per second, although other target velocities are within the contemplated scope of this disclosure.

If the second door velocity is at the second threshold (i.e., is equal to the second threshold), the control scheme 400 continues to block 416. If the second door velocity is greater than the second threshold, the control scheme 400 remains and/or returns to block 412. In other words, the control scheme 400 continually and/or periodically measures the second door velocity until the second threshold is reached. If the second door velocity is less than the second threshold, the control scheme 400 continues to block 418.

At block 416, the control scheme 400 completes a tip-to-close operation. In some embodiments, the tip-to-close operation includes closing the door until a fully closed condition is achieved. In some embodiments, the tip-to-close operation includes closing the door at a predetermined closing speed. In some embodiments, the predetermined closing speed is equal to the second door velocity, although other closing speeds are within the contemplated scope of this disclosure. For example, in some embodiments, the second target velocity is 17 degrees per second and the predetermined closing speed is 17 degrees per second. In other words, continuing from the previous example, if, after 200 milliseconds, a door is decelerating at 17 degrees per second, the control scheme 400 will activate tip-to-close (power closing).

At block 418, the control scheme 400 cancels a tip-to-close operation. In some embodiments, the control scheme 400 allows the door to continue to be operated in a manual mode (i.e., by a user of the vehicle 100). In this manner, the control scheme 400 avoids an unintended activation of the tip-to-close operation. In other words, continuing from the previous example, if a door decelerated from 28 degrees per second to 17 degrees per second (or lower) before 200 milliseconds, the control scheme 400 will allow the door to move in a manual mode.

Figure 5:
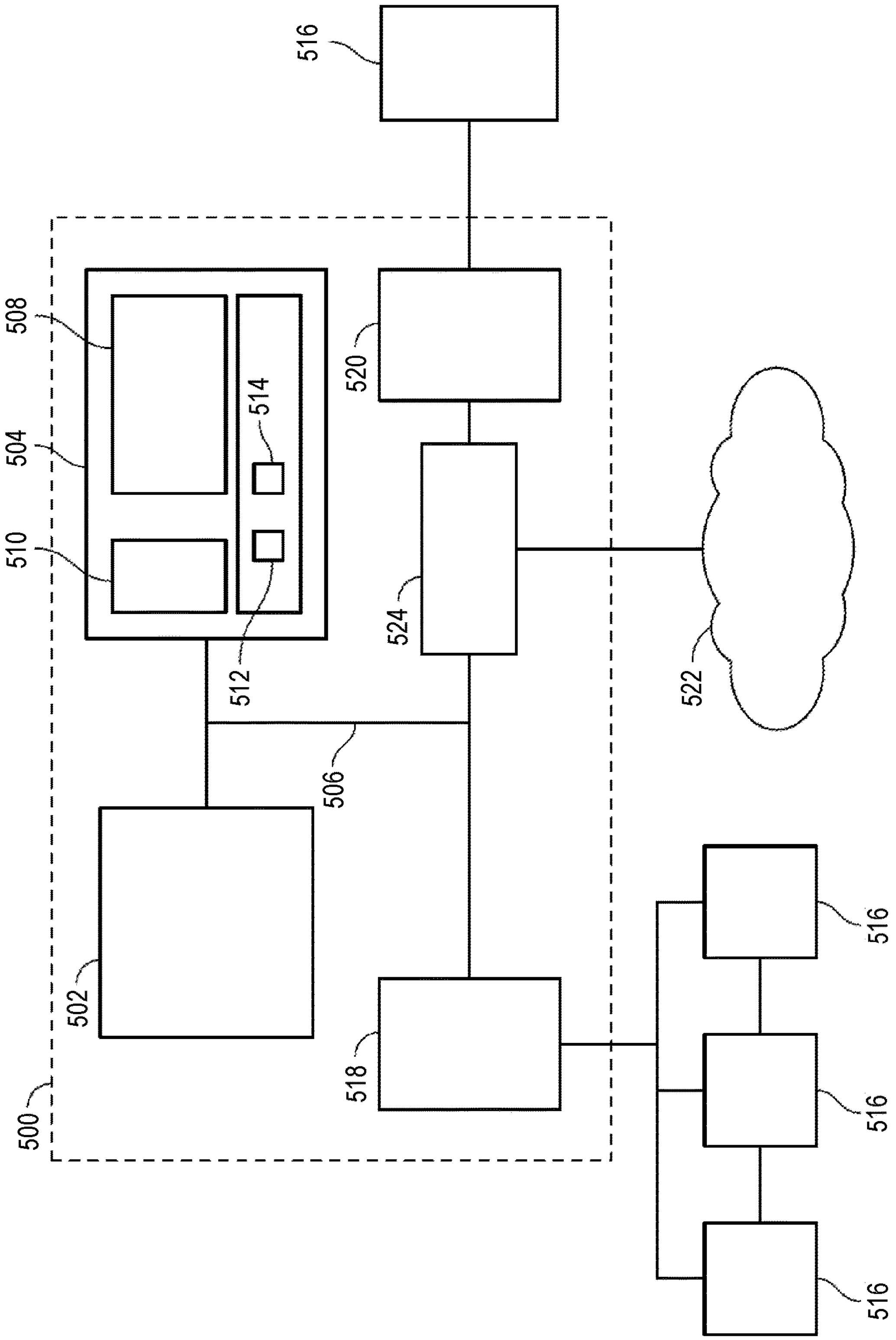
FIG. 5 is a computer system according to one or more embodiments.

FIG. 5 illustrates aspects of an embodiment of a computer system 500 that can perform various aspects of embodiments described herein. In some embodiments, the computer system 500 can be incorporated within or in combination with a door control system (e.g., the door control system 110 and/or SAM 206 of FIG. 2). The computer system 500 includes at least one processing device 502, which generally includes one or more processors for performing a variety of functions, such as, for example, controlling power assist and tip-to-close functions for one or more doors (e.g., the door 108 of the vehicle 100). More specifically, the computer system 500 can include the logic necessary (refer to FIGS. 3 and 4) to direct a door and/or an actuator (refer to FIG. 2) to open and/or close the door.

Components of the computer system 500 include the processing device 502 (such as one or more processors or processing units), a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media.

For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to control of a door, such as providing power assist and/or tip-to-close functionality. The computer system 500 is not so limited, as other modules may be included depending on the desired functionality of the vehicle 100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to initiate and/or stop a power assist opening, power assist closing, and/or tip-to-close function of a door 108 of the vehicle 100.

The processing device 502 can also be configured to communicate with one or more external devices 516 such as, for example, a keyboard, a pointing device, and/or any devices (e.g., a network card, a modem, vehicle ECUs, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc.

Figure 6:
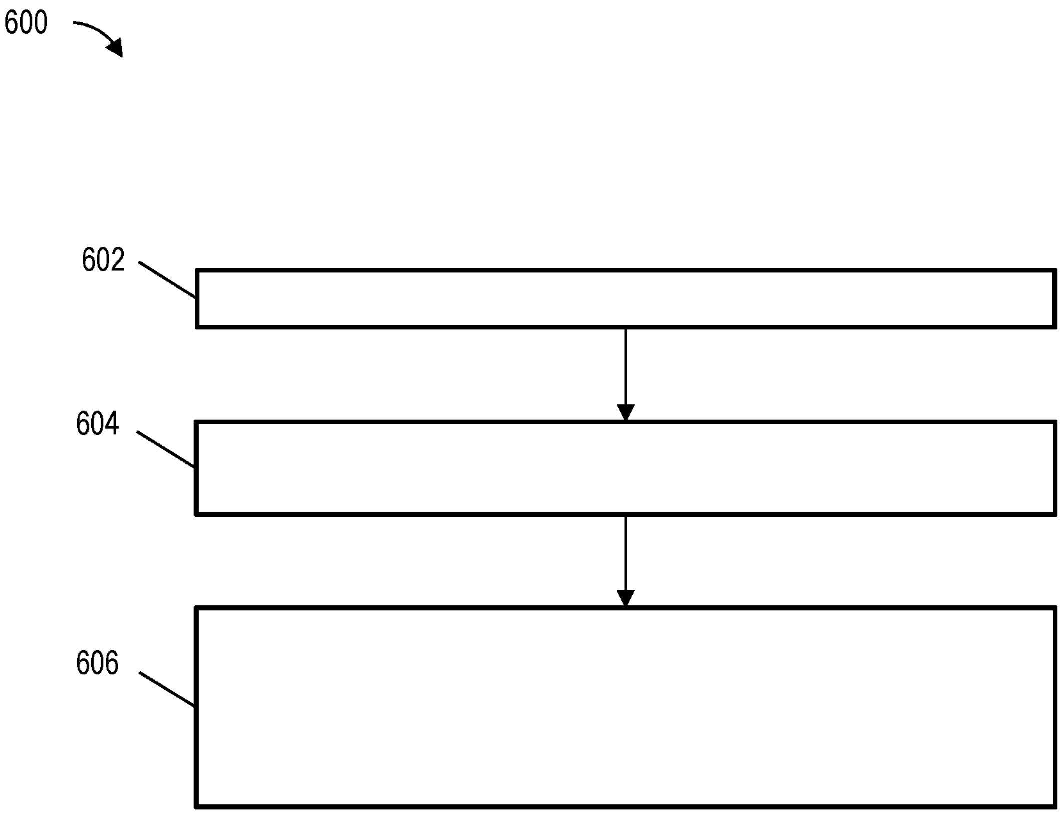
FIG. 6 is a flowchart in accordance with one or more embodiments.

Referring now to FIG. 6, a flowchart 600 for leveraging a door control system with tip-to-close functionality for use in doors having a power assist function is generally shown according to an embodiment. The flowchart 600 is described in reference to FIGS. 1 to 5 and may include additional steps not depicted in FIG. 6. Although depicted in a particular order, the blocks depicted in FIG. 6 can be rearranged, subdivided, and/or combined.

At block 602, an actuator is configured to open and close a power-assist door. In some embodiments, the actuator is a back-drivable motor. At block 604, a sensor is configured to measure a velocity of the power-assist door. In some embodiments, the sensor is a Hall sensor.

At block 606, a servo-assist module (SAM) is communicatively coupled to the actuator and the sensor. The SAM is configured to initiate a tip-to-close function of the power-assist door responsive to door velocity measurements from the sensor and a natural deceleration rate of the power-assist door caused by actuator dampening.

In some embodiments, initiating the tip-to-close function of the power-assist door includes determining that a first velocity of the power-assist door measured at a first time has reached a first target velocity, determining that a second velocity of the power-assist door measured at a second time after the first time has reached a second target velocity, and comparing a door deceleration rate between the first time and the second time to a deceleration threshold. In some embodiments, the deceleration threshold is equal to the natural deceleration rate of the power-assist door caused by actuator dampening.

In some embodiments, initiating the tip-to-close function further includes, responsive to the door deceleration rate being equal to or less than the deceleration threshold, instructing the actuator to fully close the power-assist door. In some embodiments, initiating the tip-to-close function further includes, responsive to the door deceleration rate being greater than the deceleration threshold, maintaining the power-assist door in a manually operated state.

In some embodiments, the first target velocity is equal to 28 degrees per second and the second target velocity is equal to 17 degrees per second.

In some embodiments, initiating the tip-to-close function of the power-assist door includes determining that a first velocity of the power-assist door measured at a first time has reached a first target velocity, waiting for a predetermined delay duration, and comparing, after the predetermined delay duration, a second velocity of the power-assist door to a second target velocity.

In some embodiments, initiating the tip-to-close function of the power-assist door further includes, responsive to the second velocity being equal to the second target velocity, instructing the actuator to fully close the power-assist door. In some embodiments, initiating the tip-to-close function of the power-assist door further includes, responsive to the second velocity being less than the second target velocity, maintaining the power-assist door in a manually operated state.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A door control system comprising:
- an actuator configured to open and close a power-assist door;
- a sensor configured to measure a velocity of the power-assist door; and
- a servo-assist module (SAM) communicatively coupled to the actuator and the sensor, the SAM configured to initiate a tip-to-close function of the power-assist door responsive to door velocity measurements from the sensor and a natural deceleration rate of the power-assist door caused by actuator dampening;
- wherein initiating the tip-to-close function of the power-assist door comprises:
  - determining that the power-assist door is in an open position;
  - measure a velocity of the power-assist door until a first velocity of the power-assist door measured at a first time has reached a first target velocity, the first velocity defining a minimum speed threshold for activating the tip-to-close function;
  - responsive to the first velocity of the power-assist door reaching the first target velocity, measure the velocity of the power-assist door until a second velocity of the power-assist door measured at a second time after the first time has reached a second target velocity, the second target velocity less than the first target velocity; and
  - responsive to the second velocity of the power-assist door reaching the second target velocity, determining a door deceleration rate over an interval between achieving the first door velocity and achieving the second door velocity and comparing the door deceleration rate to a deceleration threshold, wherein the deceleration threshold is equal to the natural deceleration rate of the power-assist door caused by actuator dampening.

2. The door control system of claim 1, further comprising, responsive to the door deceleration rate being equal to or less than the deceleration threshold, instructing the actuator to fully close the power-assist door.

3. The door control system of claim 1, further comprising, responsive to the door deceleration rate being greater than the deceleration threshold, maintaining the power-assist door in a manually operated state.

4. The door control system of claim 1, wherein the first target velocity comprises 28 degrees per second and the second target velocity comprises 17 degrees per second.

5. The door control system of claim 1, wherein initiating the tip-to-close function of the power-assist door comprises:

determining that a first velocity of the power-assist door measured at a first time has reached a first target velocity;

waiting for a predetermined delay duration; and comparing, after the predetermined delay duration, a second velocity of the power-assist door to a second target velocity.

6. The door control system of claim 5, further comprising:

responsive to the second velocity being equal to the second target velocity, instructing the actuator to fully close the power-assist door; and responsive to the second velocity being less than the second target velocity, maintaining the power-assist door in a manually operated state.

7. The door control system of claim 1, wherein measuring the velocity of the power-assist door until the first velocity of the power-assist door measured at the first time has reached the first target velocity comprises continually or periodically measuring the velocity of the power-assist door until the first target velocity is reached.

8. The door control system of claim 7, wherein measuring the velocity of the power-assist door until the second velocity of the power-assist door measured at the second time has reached the second target velocity comprises continually or periodically measuring the velocity of the power-assist door until the second target velocity is reached.

9. A vehicle comprising:

a power-assist door; and a door control system comprising:

an actuator configured to open and close the power-assist door;

a sensor configured to measure a velocity of the power-assist door; and a servo-assist module (SAM) communicatively coupled to the actuator and the sensor, the SAM configured to initiate a tip-to-close function of the power-assist door responsive to door velocity measurements from the sensor and a natural deceleration rate of the power-assist door caused by actuator dampening;

wherein initiating the tip-to-close function of the power-assist door comprises:

determining that the power-assist door is in an open position;

measure a velocity of the power-assist door until a first velocity of the power-assist door measured at a first time has reached a first target velocity, the first velocity defining a minimum speed threshold for activating the tip-to-close function;

responsive to the first velocity of the power-assist door reaching the first target velocity, measure the velocity of the power-assist door until a second velocity of the power-assist door measured at a second time after the first time has reached a second target velocity, the second target velocity less than the first target velocity; and responsive to the second velocity of the power-assist door reaching the second target velocity, determining a door deceleration rate over an interval between achieving the first door velocity and achieving the second door velocity and comparing the door deceleration rate to a deceleration threshold, wherein the deceleration threshold is equal to the natural deceleration rate of the power-assist door caused by actuator dampening.

10. The vehicle of claim 9, further comprising, responsive to the door deceleration rate being equal to or less than the deceleration threshold, instructing the actuator to fully close the power-assist door.

11. The vehicle of claim 9, further comprising, responsive to the door deceleration rate being greater than the deceleration threshold, maintaining the power-assist door in a manually operated state.

12. The vehicle of claim 9, wherein the first target velocity comprises 28 degrees per second and the second target velocity comprises 17 degrees per second.

13. The vehicle of claim 9, wherein initiating the tip-to-close function of the power-assist door comprises:

determining that a first velocity of the power-assist door measured at a first time has reached a first target velocity;

waiting for a predetermined delay duration; and comparing, after the predetermined delay duration, a second velocity of the power-assist door to a second target velocity.

14. The vehicle of claim 13, further comprising:

responsive to the second velocity being equal to the second target velocity, instructing the actuator to fully close the power-assist door; and responsive to the second velocity being less than the second target velocity, maintaining the power-assist door in a manually operated state.

15. A method for controlling power-assist doors, the method comprising:

providing an actuator configured to open and close a power-assist door;

providing a sensor configured to measure a velocity of the power-assist door; and providing a servo-assist module (SAM) communicatively coupled to the actuator and the sensor, the SAM configured to initiate a tip-to-close function of the power-assist door responsive to door velocity measurements from the sensor and a natural deceleration rate of the power-assist door caused by actuator dampening;

wherein initiating the tip-to-close function of the power-assist door comprises:

determining that the power-assist door is in an open position;

measure a velocity of the power-assist door until a first velocity of the power-assist door measured at a first time has reached a first target velocity, the first velocity defining a minimum speed threshold for activating the tip-to-close function;

responsive to the first velocity of the power-assist door reaching the first target velocity, measure the velocity of the power-assist door until a second velocity of the power-assist door measured at a second time after the first time has reached a second target velocity, the second target velocity less than the first target velocity; and responsive to the second velocity of the power-assist door reaching the second target velocity, determining a door deceleration rate over an interval between achieving the first door velocity and achieving the second door velocity and comparing the door deceleration rate to a deceleration threshold, wherein the deceleration threshold is equal to the natural deceleration rate of the power-assist door caused by actuator dampening.

16. The method of claim 15, further comprising, responsive to the door deceleration rate being equal to or less than the deceleration threshold, instructing the actuator to fully close the power-assist door.

17. The method of claim 15, further comprising, responsive to the door deceleration rate being greater than the deceleration threshold, maintaining the power-assist door in a manually operated state.

18. The method of claim 15, wherein the first target velocity comprises 28 degrees per second and the second target velocity comprises 17 degrees per second.

19. The method of claim 15, wherein initiating the tip-to-close function of the power-assist door comprises:

determining that a first velocity of the power-assist door measured at a first time has reached a first target velocity;

waiting for a predetermined delay duration; and comparing, after the predetermined delay duration, a second velocity of the power-assist door to a second target velocity.

20. The method of claim 15, wherein measuring the velocity of the power-assist door until the first velocity of the power-assist door measured at the first time has reached the first target velocity comprises continually or periodically measuring the velocity of the power-assist door until the first target velocity is reached.

* * * * *